US009592881B2

(12) United States Patent
Menefee

(10) Patent No.: US 9,592,881 B2
(45) Date of Patent: Mar. 14, 2017

(54) SPRINGER FRONT END

(71) Applicant: Dana Menefee, Sioux City, IA (US)

(72) Inventor: Dana Menefee, Sioux City, IA (US)

(*) Notice: Subject to any disclaimer, the term of this patent is extended or adjusted under 35 U.S.C. 154(b) by 0 days.

(21) Appl. No.: 14/608,307

(22) Filed: Jan. 29, 2015

(65) Prior Publication Data
US 2015/0210343 A1 Jul. 30, 2015

Related U.S. Application Data

(60) Provisional application No. 61/933,347, filed on Jan. 30, 2014.

(51) Int. Cl.
B62K 25/08 (2006.01)

(52) U.S. Cl.
CPC .......... B62K 25/08 (2013.01); *Y10T 29/49622* (2015.01)

(58) Field of Classification Search
CPC .... Y10T 29/49622; B62K 25/08; B62K 1/00; B62K 21/04; B62K 2025/042
See application file for complete search history.

(56) References Cited

U.S. PATENT DOCUMENTS

| | | | | |
|---|---|---|---|---|
| 1,189,874 A * | 7/1916 | Schickel | ............... | B62K 25/16 280/277 |
| 1,834,308 A * | 12/1931 | Harley | ................. | B62K 25/16 280/276 |
| 2,537,679 A * | 1/1951 | Kraeft | ................... | B62K 25/16 280/277 |
| 3,954,284 A * | 5/1976 | Phillips | ................. | B62K 25/16 280/277 |
| 4,775,163 A * | 10/1988 | McGowan | ............ | F16C 11/045 280/277 |
| 5,026,083 A * | 6/1991 | Wendorf | .................. | B62J 15/02 280/152.1 |
| 5,509,675 A * | 4/1996 | Barnett | .................. | B62K 25/08 188/269 |
| 5,855,388 A * | 1/1999 | Brewer | .................... | B62J 11/00 224/424 |
| 5,924,714 A * | 7/1999 | Farris | ..................... | B62K 21/20 280/276 |
| 6,017,047 A * | 1/2000 | Hoose | ...................... | B60G 3/01 280/276 |
| 6,164,675 A * | 12/2000 | Pickering | ............... | B62K 21/04 180/219 |
| 6,241,391 B1 * | 6/2001 | Hoose | ...................... | B60G 3/01 188/322.16 |

(Continued)

*Primary Examiner* — Kevin Hurley
*Assistant Examiner* — Gabriela C Craciun
(74) *Attorney, Agent, or Firm* — McKee, Voorhees & Sease, PLC

(57) ABSTRACT

A springer front end assembly for a motorcycle is provided. The assembly is generally universal in that it can be incorporated with substantially any make and/or model of a motorcycle to replace the front end suspension of the motorcycle with a springer front end suspension. Few to no modifications are made to the motorcycle. A spring retainer is added to the components of the front end of a motorcycle, and springs or other resilient members are included to provide the suspension for the springer front end. A method of replacement is also included, wherein the existing front end of a motorcycle is replaced with a springer assembly.

20 Claims, 5 Drawing Sheets

(56) References Cited

U.S. PATENT DOCUMENTS

| | | | | |
|---|---|---|---|---|
| 6,260,869 B1* | 7/2001 | Hanlon | ................... | B62L 1/00 |
| | | | | 188/26 |
| 6,260,870 B1* | 7/2001 | Fan | ................... | B62K 25/08 |
| | | | | 280/276 |
| 6,457,732 B2* | 10/2002 | Ito | ................... | B62K 25/08 |
| | | | | 180/219 |
| 6,976,691 B1* | 12/2005 | Song | ................... | B62K 21/04 |
| | | | | 280/279 |
| D514,477 S * | 2/2006 | Doll | ................... | D12/118 |
| 7,111,700 B2* | 9/2006 | Czysz | ................... | B62K 25/08 |
| | | | | 180/219 |
| 7,121,568 B2* | 10/2006 | Law | ................... | B62K 11/14 |
| | | | | 280/279 |
| 7,207,585 B2* | 4/2007 | Czysz | ................... | B62K 21/02 |
| | | | | 180/219 |
| D542,718 S * | 5/2007 | Costa | ................... | D12/118 |
| 7,441,622 B2* | 10/2008 | Costa | ................... | B62K 21/04 |
| | | | | 180/219 |
| 7,540,516 B2* | 6/2009 | Arnce | ................... | B62K 5/027 |
| | | | | 280/263 |
| 2005/0023794 A1* | 2/2005 | Czysz | ................... | B62K 25/08 |
| | | | | 280/276 |
| 2005/0127636 A1* | 6/2005 | Czysz | ................... | B62K 21/02 |
| | | | | 280/276 |
| 2008/0099968 A1* | 5/2008 | Schroeder | ............. | B62K 25/08 |
| | | | | 267/166 |
| 2010/0044975 A1* | 2/2010 | Yablon | ................... | B60G 11/27 |
| | | | | 280/5.503 |
| 2011/0079945 A1* | 4/2011 | Powell | ................... | B62K 25/08 |
| | | | | 267/286 |
| 2013/0319805 A1* | 12/2013 | Becker | ................... | F16F 9/435 |
| | | | | 188/322.13 |

* cited by examiner

SPRINGER FRONT END

CROSS-REFERENCE TO RELATED APPLICATIONS

This application claims priority under 35 U.S.C. §119 to provisional application Ser. No. 61/933,347, filed Jan. 30, 2014, herein incorporated by reference in its entirety.

FIELD OF THE INVENTION

The invention relates generally to motorcycles. More particularly, but not exclusively, the invention relates to a springer fork assembly for motorcycles that can be retrofit onto most existing motorcycles.

BACKGROUND OF THE INVENTION

The chassis of a motorcycle includes the frame and suspension, along with the front forks, of the vehicle. A motorcycle fork is the portion of a motorcycle that holds the front wheel and allows one to steer. For handling, the front fork is the most critical part of a motorcycle. The combination of rake and trail determines how stable the motorcycle is. A fork generally consists of two fork tubes (sometimes also referred to as forks), which hold the front wheel axle, and a triple tree, which connects the fork tubes and the handlebars to the frame with a pivot that allows for steering. A motorcycle fork connects a motorcycle's front wheel and axle to its frame, typically via a pair of triple clamps. It typically incorporates the front suspension and front brake, and allows the bike to be steered via handlebars attached to the top clamp. There are many types of motorcycles forks, such as telescopic forks, trailing link forks, leading link forks springer forks, Earles forks, girder forks, Saxon-Motodd forks, Hossack/Fior forks, to name a few.

The springer fork is an early type of leading link fork. A springer fork does not have the suspension built into the fork tubes, but instead has it mounted externally, where it may be integrated into the triple tree. This style of fork may be found on antique motorcycles or choppers, and is available today on some models of motorcycles.

While it may have an exposed spring near the triple clamp, a springer fork is distinguishable from a girder fork by its two parallel sets of legs. The rear is firmly fixed to the bottom triple clamp (usually brazed or welded). A short leading link holds the wheel and the forward leg, which actuates the springs (usually mounted on the triple clamp).

Most motorcycles, when equipped with springer forks, are made with components welded or otherwise constructed in a way such that the entire fork must be replaced to repair or otherwise replace the fork. In addition, several modifications must be made to the motorcycle frames in order to replace the forks using a non-OEM component, such as when making a chopper or changing the ride of a motorcycle. Such modifications must be made to the frame as well as the handlebars, which can affect the ride of the motorcycle, including the steering.

Therefore, there is a need in the art for a springer fork assembly that can be incorporated into existing motorcycles without the need for modifications or changing of the motorcycle frames or handlebars, such that the replacement fork assembly can be quickly and easily attached to the motorcycle.

SUMMARY OF THE INVENTION

Therefore, it is a principal object, feature, and/or advantage of the present invention to overcome the deficiencies in the art.

It is another object, feature, and/or advantage of the present invention to provide a springer fork assembly for a motorcycle that requires little to no modifications in order to attach to existing motorcycles.

It is still another object, feature, and/or advantage of the present invention to provide a fork assembly that can convert non-springer fork motorcycles into motorcycles including a springer fork front end.

It is yet a further object, feature, and/or advantage of the present invention to provide a spring retainer for a springer fork assembly that can be used with existing triple trees to convert to a springer front end.

It is a further object, feature, and/or advantage of the present invention to provide a spring retainer for quickly and easily modifying a motorcycle front end without modifications being made to the frame.

These and/or other objects, features, and advantages of the present invention will be apparent to those skilled in the art. The present invention is not to be limited to or by these objects, features and advantages. No single embodiment need provide each and every object, feature, or advantage.

The present invention provides for a springer fork assembly that includes a spring retainer for use with existing motorcycle frames and front ends that allows for the conversion, replacement, repair, etc. of a motorcycle front end to provide a springer fork assembly for the front end of the motorcycle frame. The springer frame of the invention can be used with existing or stock triple trees of the motorcycle front end to hold the springs of the springer fork in place relative to the existing triple trees.

The spring retainer includes a substantially rigid member comprising first and second apertures for receiving the fixed fork of the front end of the motorcycle. The spring retainer also includes inner apertures including recesses. The apertures are configured to receive pins therethrough and extending from an upper fixed portion to a lower frame member. The portion of the pins extending between the spring retainer and the upper fixed portion include a recoil spring surrounding the pins and held in place. The portion of the pins extending from the spring retainer to the lower frame member includes a compression spring surrounding the pins and held in place.

The retainer ring can be sized to accommodate various makes, models, and sizes of motorcycles, including different widths and lengths of the forks. This includes varying the width of the apertures, as well as the overall shape, curvature, and other aspects of the spring retainer, which can be quickly and easily adapted to fit existing motorcycle frames without having to modify the frames of the motorcycle.

The invention also includes a method of installing a springer fork assembly as shown and described. The stock tubes of the motorcycle front end are slid out of the existing triple trees. The spring retainer is positioned between the triple trees, with a recoil spring, pins, and compression springs in place. The tubes are replaced through the triple trees and the spring retainer apertures, and the assembly is fixed in position with the motorcycle frame. The front end of the motorcycle has now been replaced with a springer front end, without having to modify, weld, or otherwise change the configuration of the motorcycle frame.

Figure 1:
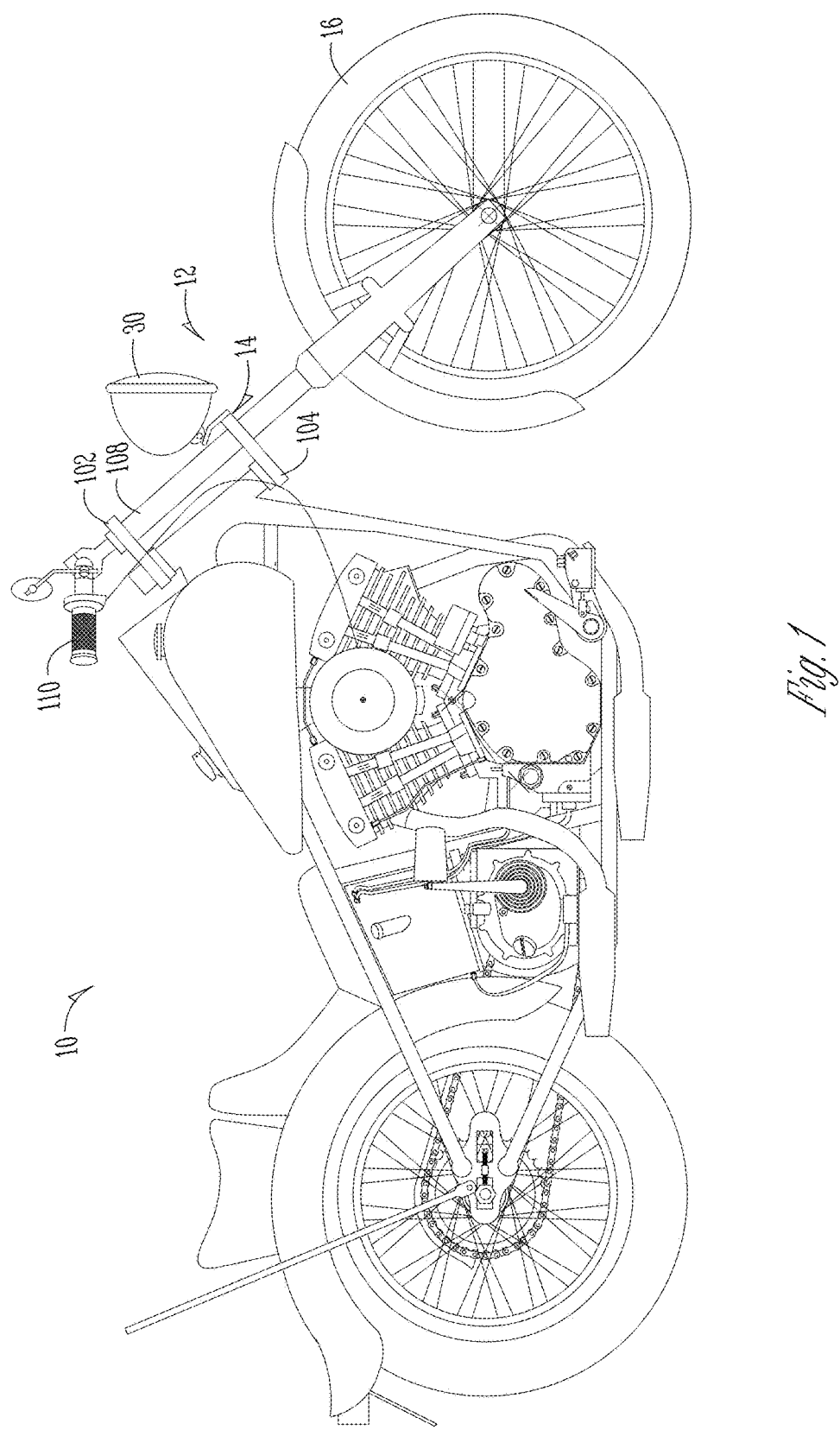
FIG. 1 is a side elevation view of a motorcycle.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a view of a motorcycle 10 including a springer front end assembly. The springer front end assembly 12 includes triple trees 14 which are permanently attached to the frame of the motorcycle 10, such as by welding or molding the components to make a single unitary member. In other words, the springer front end assembly 12 shown in FIG. 1 is a solid construction, which is not easy to replace, repair, etc. For example, to replace the springer assembly 12 of the motorcycle 10, the whole assembly must be replaced, and several modifications must be made to the frame and handlebars. Such modifications make the replacement of the assembly difficult, timely, and inefficient, while also possibly changing the ride of the motorcycle. For example, as the handle bars and frame must be modified to install a replacement springer assembly 12, the modifications could affect how the handle bars and frame correspond with the front wheel 16, which could affect the alignment and ride of the motorcycle. This could potentially raise some safety concerns for use of the motorcycle, due to the modifications made thereto.

Therefore, the invention provides a novel springer front end assembly and method of replacement on existing motorcycles, which will require minimal to no modifications being made to the existing motorcycle for which the springer assembly 50 of the invention is to be attached. FIGS. 2-5, therefore, show aspects of a springer front end assembly 50 for use with a motorcycle 10, such as that shown in FIG. 1, according to some embodiments and aspects of the present invention. The springer assembly 50 of the present invention will not affect the ride and steering capabilities of the motorcycle. Furthermore, no modifications will need to be made to the motorcycle frame and/or handle bars such that the ride and safety of the motorcycle should not be affected by the replacement or incorporation of the springer front end assembly 50.

Figure 2:
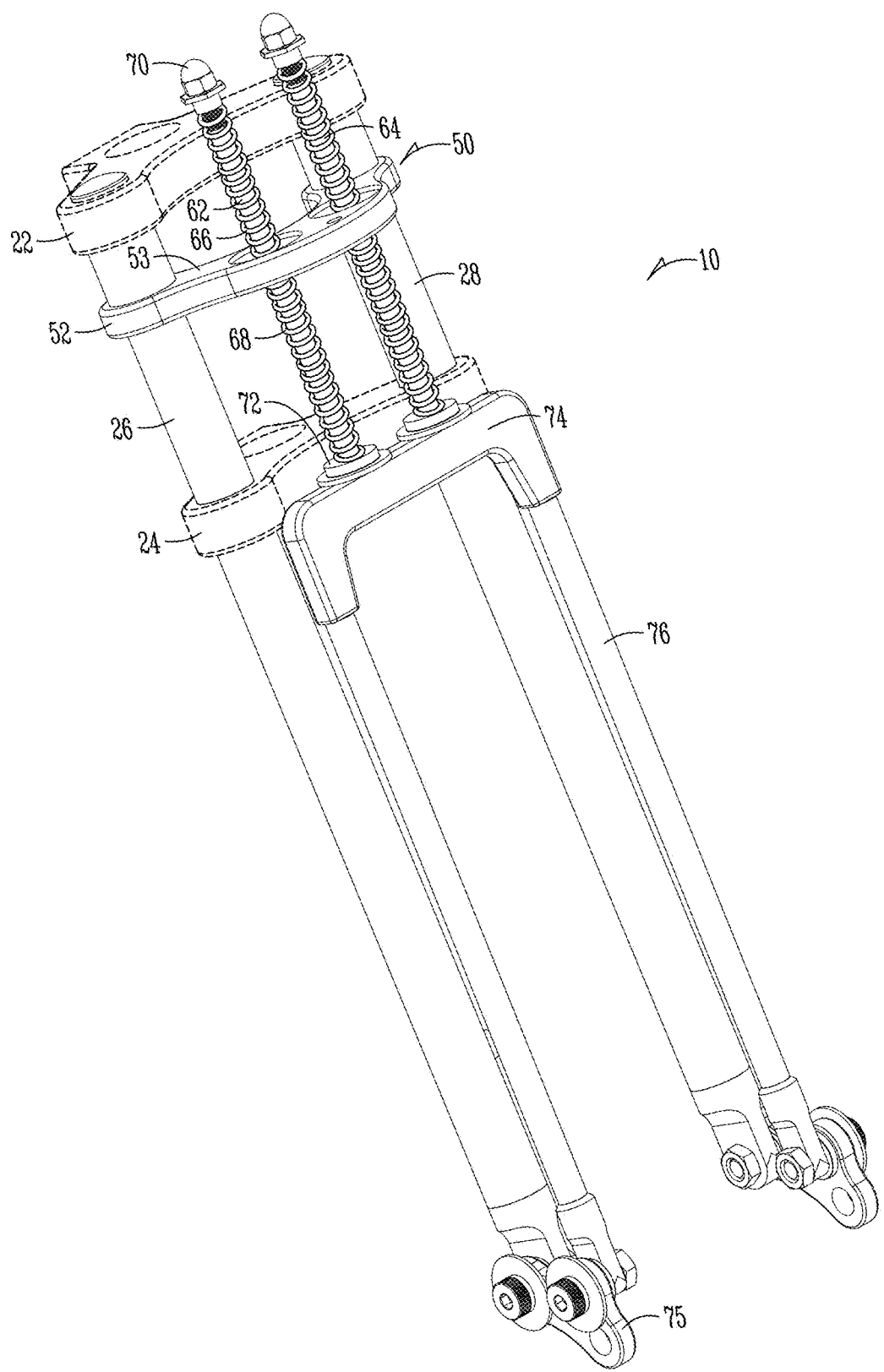
FIG. 2 is a perspective view of a springer front end assembly according to aspects of the invention.
Figure 3:
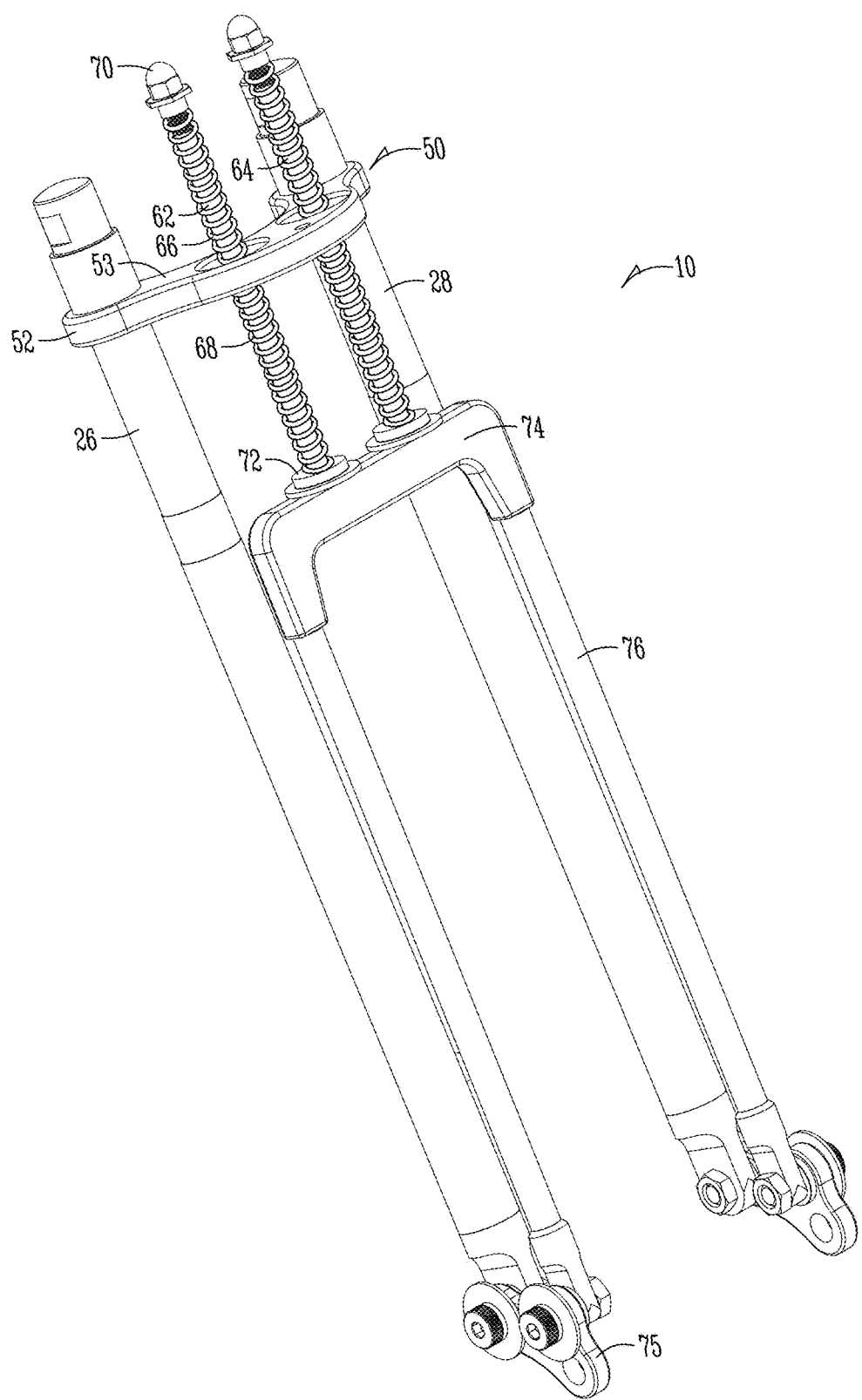
FIG. 3 is another view of the springer front end assembly.
Figure 4:
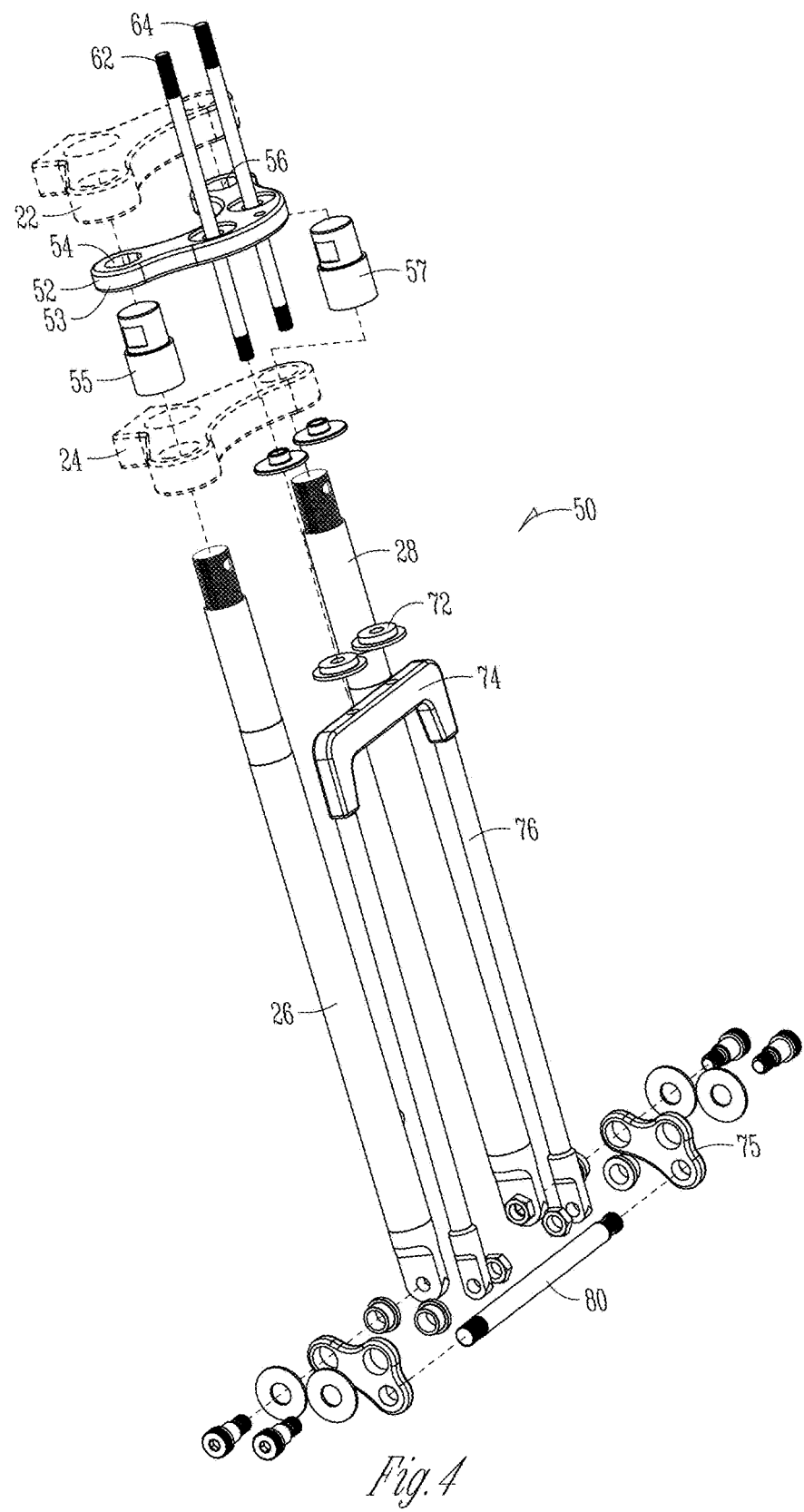
FIG. 4 is an exploded view of the springer front end assembly.

FIGS. 2 and 3 show an enlarged portion of the front end of a motorcycle 10, and FIG. 4 shows an exploded view. As shown in the figures, the motorcycle 10 including the springer front and the assembly 50 of the invention is able to utilize the triple trees 22, 24 of the motorcycle 10 without replacing said trip trees 22, 24. Furthermore, the forks 26, 28 which are attached to and extend through the trip trees 22, 24 will also be able to be maintained. However, it is further contemplated that the forks 26, 28 may be modified slightly to accommodate the placement of the springer assembly 50, while not modifying the frame of the motorcycle 10 itself. Instead, the forks 26, 28 may be replaced to handle or otherwise fit additional components of the springer assembly 50. However, the trip trees 22, 24 that are part of the motorcycle frame of the motorcycle 10 will not be modified, such that the steering and support of the motorcycle, including the front wheel thereof, will not be affected by the replacement and use of the springer assembly 50 of the invention.

Components of the springer assembly 50 as shown in the figures include a spring retainer member 52 positioned generally between the first or upper triple tree 22 and the second or lower triple tree 24. The springer retainer 52, as will be understood, includes components that allow the conversion of a non-springer front of a motorcycle to a springer front and/or fork assembly of a motorcycle. The first and second fork members 26, 28 are able to pass through the spring retainer 52, such that they can further attach to and pass through the first and second triple tree members 22, 24, as is shown in the figures. Additional components of the springer assembly 50 include first and second pins 62, 64, which may also be known as spring pins. The pins or spring pins 62, 64 pass through the springer retainer 52 and are surrounded by springs or other resilient members to provide shock absorbers for the front end of a motorcycle. For example, the springer front and assembly 50 may include an upper spring member 66 and a lower spring member 68. The upper spring member 66 may also be known as a recoil spring, while the lower spring member 68 may also be known as a compression spring. In addition, it is contemplated that additional spring members be housed within the upper and lower springs 66, 68 to provide for additional shock or compression members for providing a smoother ride for the motorcycle incorporating the springer front end 50 according to the invention.

The upper spring member 66 extends generally from an upper portion of the spring retainer body 53 and is capped by a retaining member 70. For example, the retaining member 70 is shown to be a screw and washer or other member having a surface area capable of stopping the spring, which can be attached to the end portion of the spring pins 62, 64. The length of the spring pins 62, 64 between the springer retainer 52 and the retaining member 70 can be used to preload the upper spring member 66 to adjust the comfort and ride of the motorcycle. The lower spring member 68 extends from a lower side of the spring retainer body 53 and a frame member 74. The spring 68 is held in place at the frame member 70 by the use of a retaining member 72, which may be a nut, bolt, or other retaining member connected at the end or the general area of the end of the spring pin 62, 64. For example, FIG. 3 shows a portion of the spring pins 62, 64 extended beyond the frame member 74 and a nut attached thereto to hold the springs 68 in place. Therefore, the distance between the spring retainer 52 and the frame member 74 can dictate the load of the lower spring 68, and can be adjusted to provide more or less "give" (compression) by the spring to adjust the smoothness of the ride of the motorcycle.

The forks 26, 28 extend down to rockers 75, which is used to connect the wheel 16 of the motorcycle. Likewise, the frame member 74 includes legs 76 that also extend and connect to the rockers 75, which further connects the springer front end assembly 50 to the wheel 16 of the motorcycle via the axle 80, which is connected to the rockers 75.

It should be appreciated that the springer assembly 50 as shown in the figures includes such components as the spring retainer 52, springs, and spring pins, while maintaining the triple trees 22, 24, as well as a light 30 of the motorcycle (see, e.g., the light 30 in FIG. 1). Furthermore, the lower frame member 74 may also be maintained, as well as the fork members 26, 28. Thus, the only added components to the motorcycle as shown in the figures include the springer assembly components, which may be used to adjust the ride of the motorcycle and/or the look of the motorcycle without requiring modifications, such as welding, cutting, or the like to the motorcycle frame, which could affect the safety, ride ability, and otherwise for the motorcycle. This is a highly advantageous aspect of the invention.

Figure 5:
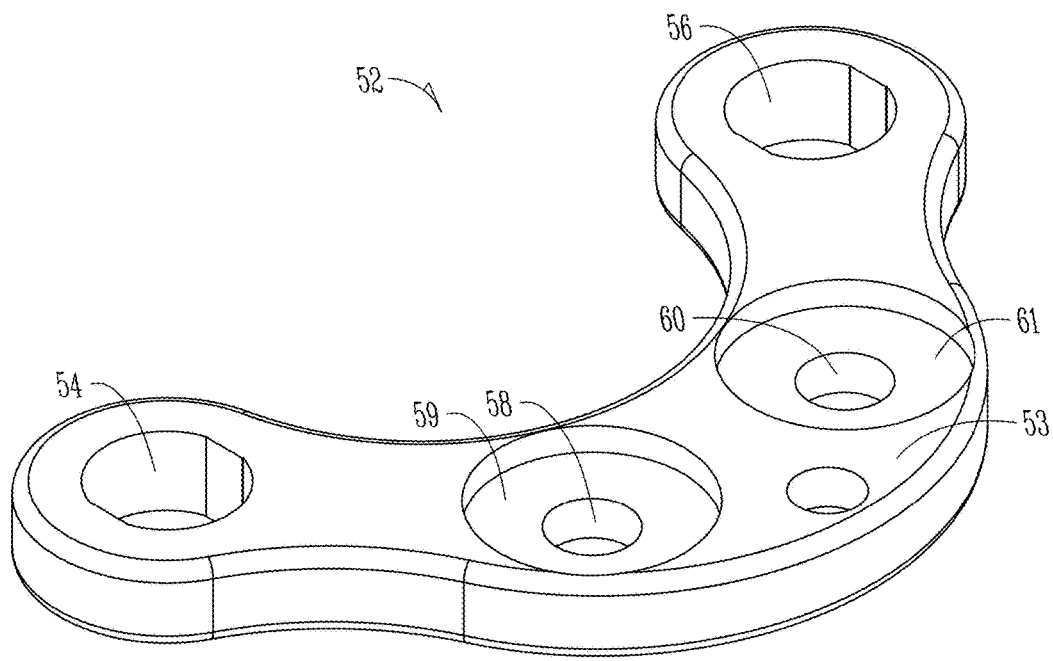
FIG. 5 is a view of a spring retainer for use with the springer front end assembly according to aspects of the invention.

FIG. 5 is a view of the spring retainer 52 according to aspects and embodiments of the invention. The spring retainer 52 includes a body 53 which may comprise a substantial rigid material, such as steel, metal, or other rigid materials capable of absorbing the forces exerted on a motorcycle during riding thereof. Furthermore, the shape, size, and other aspects of the spring retainer body 53 may be varied according to the make and/or model of a motorcycle. For example, the width of the first and second fork apertures 54, 56, may be adjusted according to the width of the forks of a motorcycle which the springer front end assembly is being added thereto. In addition, the curvature of the spring retainer body 53 may also be varied as needed. For example, the curvature may provide some space between the fork apertures and the springs, to account for existing components of a motorcycle, such as a headlight, wires, brake tubes, and the like. Therefore, the curvature may be more or less than that shown in FIG. 5. Other components of the spring retainer body 53 may also be adjusted to account for existing components or shapes of a motorcycle front end. The spring retainer body 53 may be formed by molding, cutting, or otherwise forming the body from a piece of material. The invention is not to be limited to specific ways of forming the substantially rigid body shown throughout the figures.

The spring retainer 52 includes first and second fork apertures 54, 56, which are positioned generally at opposite ends of the spring retainer body 53. The fork apertures 54, 56 are configured to receive the forks of the front end of the motorcycle frame, and thus can be sized accordingly. Therefore, the invention contemplates that the fork apertures 54, 56 be drilled, molded as part of, or otherwise formed through the spring retainer body 53 according to the make and model of the motorcycle to which the assembly 50 is to be used. The spring retainer 52 may also include sleeves 55 positioned at the upper side of the spring retainer body 53 and operatively connected to the fork apertures 54, 56. The sleeves 55 may provide additional support for attaching the spring retainer 52 to the existing frame of a motorcycle. Thus, the sleeves 55 could be positioned in the apertures of the upper triple tree member 22 to provide spacing between the triple tree member and the spring retainer 52. The length of the sleeves 55 could be adjusted accordingly and to need or desire. Further aspects of the sleeves 55 could be used to adjust the diameter of the fork apertures 54, 56 to account for varying diameters of forks 54, 56 to be used with the springer assembly 50, as well as the motorcycle itself. For example, a one-size-fit-all spring retainer body 53 could be envisioned, such that the sleeves 55 could be positioned in the fork apertures 54, 56 to account for a smaller sized fork being passed therethrough.

Also included as part of the spring retainer 52 are first and second pin apertures 58, 60 formed through the spring retainer body 53. The pin retaining apertures 58, 60 include recess sections 59, 61 positioned generally about the apertures on both the upper and lower sides of the spring retainer body 53. The apertures 58, 60 are configured to allow the spring pins to pass therethrough. The recessed portions 59, 61 provide a seat or location for a portion of the spring to reside. The recessed portion 59, 61 will aid in keeping the spring aligned, such that the walls of the recess portion 59, 61 will not allow the springs to slide about the upper and lower portions of the spring retainer body 53. The pin apertures and recesses could be formed by drilling, molding, or otherwise machining to account for varying sizes of springs and pins.

As has been shown and described, the spring retainer 52 is vital to provide for the modification of incorporating the springer front end assembly 50 of the invention to an existing motorcycle frame without or with minimal modifications thereto. The spring retainer 52, including the body 53 thereof, provides for the addition of upper and lower spring members to the frame, without having to weld, or otherwise permanently affix another member to the frame itself. Furthermore, the spring retainer 52 allows for the use of the stocked triple trees 22, 24 of the motorcycle 10, which will reduce the need to cut any portion of the frame of the existing motorcycle, which could affect the safety of the motorcycle itself. Therefore, a motorcycle 10, such as that shown in FIG. 1, could be modified to include such a springer end assembly 50 without modifying the overall front end of the motorcycle.

Additional aspects of the invention include the replacement and addition of the springer assembly 50 to an existing motorcycle 10. A motorcycle 10, such as that shown in FIG. 1, includes an upper tree 102, lower tree 104, and first and second fork members 106, 108 (note that fork member 106 is behind member 108 in FIG. 1). However, the front end shown in FIG. 1 of the motorcycle 10 is not a springer front end, and is one of another type. While the specific type of front end is not shown in detail, it is contemplated that the invention could be used to replace generally any type of front end with a springer front end assembly 50 of the invention.

Therefore, to begin replacement of the front end of the motorcycle 10 with the springer assembly 50 of the invention, the forks 106, 108 are removed from the front of the motorcycle 10. The forks, which are used to attach the handlebars 110 to the front wheel 16, aid in steering as well as support of the motorcycle 10. However, the upper triple tree 102 and lower triple tree 104 of the motorcycle 10 of FIG. 1 could be allowed to be maintained as part of the motorcycle frame during the replacement method. This is advantageous, as the process requires no modification, such as cutting the permanently affixed triple trees 102, 104 from the frame of the motorcycle 10, which could affect the safety of the motorcycle. Additional steps could include the removal of the handlebars and headlight from the motorcycle, but this is not required. Thus, the frame of the motorcycle 10 is able to be maintained as manufactured, which will maintain the safety, overall look and feel, and other aspects of the original motorcycle. However, the use of the springer front end assembly 50 of the invention will keep the overall look of the motorcycle frame, while also providing for a springer front end look and feel for the motorcycle. This can enhance both the aesthetic and feel of the ride of the motorcycle, such as by increasing the amount of shock absorbance of the front end, such as by the type, number, and other aspects of the use of the springs of the springer front end assembly 50 of the invention.

Additional steps of the replacement of the front end include the addition of the springer retainer 52 as part of the front end of the motorcycle. As is understood, the sleeves 54, 56 are included with the spring retainer 52 to provide some spacing between said spring retainer 52 and the upper triple tree member 102. The sleeves are also used to aid in the lining and retaining of a fork member, which can be passing through the upper triple tree member 102 as well as through the spring retainer 50. The fork is passed through the lower triple tree member, and attached to the wheel to maintain the look and feel of the original motorcycle, including the motorcycle frame. The rest of the components of the springer fork assembly 50 can then be added. For example, the springs can be positioned on both sides of the spring retainer 52 and loaded or compressed by the use of retaining members and frame members, as has been shown and described with regard to the figures of the invention. The rest of the components of the motorcycle can then be re-added to reinstate the motorcycle into a riding condition. It should be noted that no structural modifications have been made to the pre-existing frame of the motorcycle, with the only addition being the addition of the springer front end assembly 50 of the present invention. This will provide for both the aesthetic look of the motorcycle, while also providing for added benefits including to the suspension of the front wheel of the motorcycle, such as by the springs of the springer front end assembly 50.

Therefore, a springer front end assembly, method of manufacture, and method of use have been shown and described. It should be appreciated that the springer front end assembly as shown and described can be used with generally any make and/or model of motorcycle, regardless of the year of manufacture. The spring retainer of the assembly can be modified prior to incorporation to the front end of the motorcycle to provide alignment with existing components of the motorcycle, such that the fame of the motorcycle will remain unchanged with regard to existing components. Thus, a generally universal or modular springer front end assembly is provided. It is contemplated that the components, including the spring retainer, can be manufactured by a machine, such as a computer numerical machine control (CNC) machine, other milling machines, welding machine, or otherwise. A computer database of known motorcycle front ends can be included and saved in a machine, computer, tablet, phone, database, server, or a separate machine attached to a machine for manufacturing the spring retainer. When the springer front end assembly of the invention is to be incorporated with an existing motorcycle, said motorcycle can be selected in the database such that the machine will automatically size the spring retainer body, number and size of apertures, and overall shape of the springer retainer body to accommodate the existing components of the make and/or model of the motorcycle, such that no modifications be required to the motorcycle itself. Instead, the modifications are made to the spring retainer of the springer front end assembly prior to attachment to the motorcycle, which will mitigate or otherwise result in no modifications being made to the motorcycle itself. The database could also provide a list of necessary components, such as springs, bolts, tools, or the like, that may be needed to make the replacement to the springer assembly front end. Furthermore, the database could be accessed remotely, such as by a computer, tablet, phone, or the like, in order for a user to remotely order a springer assembly for a specific make and/or model of a motorcycle, such that they would receive the correct components to make the replacement themselves.

It is to be appreciated that the foregoing description of the figures, embodiments, and other aspects of the invention have been included for exemplary purposes. It is contemplated that many variations, changes, or otherwise may be included as part of the invention. Those skilled in the art will appreciate any changes, modifications or otherwise, which would be obvious and included as well.

What is claimed is:

1. A springer front end assembly for use with a motorcycle, comprising:
    a spring retainer operatively connected to first and second forks of the motorcycle and positioned between upper and lower triple trees, said spring retainer including first and second fork apertures extending through the spring retainer for receiving the first and second forks of the motorcycle and further comprising sleeves positioned in the first and second fork apertures, and wherein the sleeves support forks of the motorcycle and said sleeves configured for a particular diameter of the first and second forks of the motorcycle;
    at least one upper spring positioned between the spring retainer and an upper spring stop;
    at least one lower spring positioned between the spring retainer and a lower spring stop; and
    a frame member extending from the at least one lower spring and operatively connected to the first and second forks;
    said springer front end assembly configured to be operatively attached to any make or model of motorcycle;
    wherein said springer front end assembly is used with existing forks and upper and lower triple trees of the motorcycle to provide an improved springer front end for the assembly for an existing motorcycle.

2. The springer front end assembly of claim 1, wherein said spring retainer comprising a body, wherein the first and second fork apertures positioned at opposite ends of the body and configured to receive forks of a motorcycle frame, and at least one spring pin aperture in the body for receiving a spring pin through.

3. The springer front end assembly of claim 2, wherein said spring retainer further comprising two spring pin apertures, each receiving a spring pin therethrough, with springs on both sides of the spring body.

4. The springer front end assembly of claim 1, further comprising a rocker connected to the first and second forks and first and second legs of the frame member.

5. The springer front end assembly of claim 4, wherein said rocker being connected to a wheel of the motorcycle.

6. The springer front end assembly of claim 1, further comprising first and second upper springs positioned on spring pins and extending between the spring retainer and the upper triple tree.

7. The springer front end assembly of claim 6, further comprising first and second lower springs positioned on spring pins and extending between the spring retainer and the lower triple tree.

8. The springer front end assembly of claim 7, wherein the first and second upper springs comprise recoil springs.

9. The springer front end assembly of claim 8, wherein the first and second lower springs comprise compression springs.

10. A spring retainer for a springer front end assembly on a motorcycle, comprising:
    a body;
    first and second fork apertures positioned at opposite ends of the body and configured to receive forks of a motorcycle frame;
    Sleeves positioned in the first and second fork apertures, and wherein the sleeves support forks of the motorcycle and said sleeves configured for a particular diameter of the first and second forks of the motorcycle; and
    at least one spring pin aperture in the body for receiving a spring pin through;

wherein the body configured to be operatively attached to any make or model of a motorcycle to allow for the springer front end assembly to replace a front end of the motorcycle without replacement of the forks or upper and lower triple trees of the motorcycle.

11. The spring retainer of claim 10, further comprising a first spring member positioned above the body and fixed thereto about the spring pin.

12. The spring retainer of claim 11, further comprising a second spring member positioned below the body and fixed thereto about the spring pin.

13. The spring retainer of claim 10, further comprising two spring pin apertures, each receiving a spring pin therethrough, with springs on both sides of the spring body.

14. The spring retainer of claim 10, further comprising the first and second sleeve members positioned at and extending at least partially from the first and second fork apertures.

15. The spring retainer of claim 14, wherein the first and second sleeve members positioned at least partially within the fork apertures.

16. The spring retainer of claim 15, wherein the first and second sleeve members extending from an upper side of the spring retainer body.

17. A method of installing a springer front end assembly to a motorcycle having upper and lower triple trees, and first and second forks extending from handlebars to a wheel, the method comprising:
    positioning a springer front end comprising a spring retainer on the first and second forks between the upper and lower triple trees, said spring retainer comprising first and second fork apertures positioned at opposite ends of the body and configured to receive forks of a motorcycle frame, and at least one spring pin aperture in the body for receiving a spring pin through;
    positioning first and second sleeves at an upper side of the first and second fork apertures of the spring retainer body, wherein the sleeves support forks of the motorcycle and said sleeves configured for a particular diameter of the first and second forks of the motorcycle
    positioning a first spring between an upper portion of the spring retainer and an upper spring stop;
    positioning a second spring between a lower portion of the spring retainer and a lower spring stop, said lower spring stop operatively connected to the first and second forks and the front wheel of the motorcycle;
    wherein said springer front end assembly configured to be added to any make or model of motorcycle;
    wherein said springer front end assembly is used with existing forks and upper and lower triple trees of the motorcycle to provide an improved springer front end for the assembly for an existing motorcycle.

18. The method of claim 17, wherein said lower spring stop comprising a frame member with legs extending towards the front wheel.

19. The method of claim 17, further comprising positioning first and second sleeves at the first and second fork apertures and between an upper portion of the spring retainer and the upper triple trees of the motorcycle.

20. The method of claim 17, further comprising positioning first and second upper spring members between the spring retainer and upper spring stoppers, and first and second lower spring members between the spring retainer and the lower spring stopper.

* * * * *